(12) United States Patent
Yoon et al.

(10) Patent No.: US 12,125,114 B2
(45) Date of Patent: Oct. 22, 2024

(54) METHOD, COMPUTER DEVICE, AND NON-TRANSITORY COMPUTER-READABLE RECORDING MEDIUM TO PROVIDE DYNAMIC LANDING PAGE FOR SOCIAL PLATFORM

(71) Applicant: LINE Plus Corporation, Seongnam-si (KR)

(72) Inventors: Myung Han Yoon, Seongnam-si (KR); Jihoon Yang, Seongnam-si (KR); Leila Kim, Seongnam-si (KR); Mina Kim, Seongnam-si (KR)

(73) Assignee: LINE Plus Corporation, Seongnam-si (KR)

( * ) Notice: Subject to any disclaimer, the term of this patent is extended or adjusted under 35 U.S.C. 154(b) by 0 days.

(21) Appl. No.: 17/975,757

(22) Filed: Oct. 28, 2022

(65) Prior Publication Data
US 2023/0230178 A1 Jul. 20, 2023

(30) Foreign Application Priority Data
Jan. 14, 2022 (KR) .................. 10-2022-0006027

(51) Int. Cl.
*G06Q 50/00* (2024.01)
*G06F 3/0483* (2013.01)

(52) U.S. Cl.
CPC .......... *G06Q 50/01* (2013.01); *G06F 3/0483* (2013.01)

(58) Field of Classification Search
None
See application file for complete search history.

(56) References Cited

U.S. PATENT DOCUMENTS

| | | | |
|---|---|---|---|
| 8,996,530 B2* | 3/2015 | LuVogt | G06F 16/9535 707/740 |
| 9,836,545 B2* | 12/2017 | LuVogt | G06F 16/9535 |
| 10,250,714 B2* | 4/2019 | Shao | H04L 67/34 |
| 10,592,513 B1* | 3/2020 | Cionca | H04W 4/21 |
| 10,664,150 B2* | 5/2020 | Deets, Jr. | G06F 3/0482 |
| 10,769,677 B1* | 9/2020 | Agrawal | G06F 16/9535 |
| 11,062,358 B1* | 7/2021 | Lewis | G06Q 50/01 |
| 11,321,410 B2* | 5/2022 | Feng | H04L 67/535 |
| 11,580,568 B2* | 2/2023 | Lester | G06Q 30/02 |
| 11,606,614 B1* | 3/2023 | Dasdan | H04N 21/25891 |
| 2003/0218636 A1* | 11/2003 | McIntyre | G06F 3/0481 715/809 |

(Continued)

FOREIGN PATENT DOCUMENTS

KR 10-1754373 B1 7/2017

*Primary Examiner* — Roberto Borja
*Assistant Examiner* — Maria S Ayad
(74) *Attorney, Agent, or Firm* — Harness, Dickey & Pierce, P.L.C.

(57) ABSTRACT

A method of generating a social platform service screen includes directing, by at least one processor of a computer device, the social platform service screen to land on one of a recommended feed tab and a following feed tab according to a situation associated with the social platform service screen at an entry request point in time, the recommended feed tab configured to display a personalization-based recommended post and the following feed tab configured to display relationship-based following posts contained within a following feed.

16 Claims, 12 Drawing Sheets

(56) References Cited

U.S. PATENT DOCUMENTS

| | | | |
|---|---|---|---|
| 2013/0073989 A1* | 3/2013 | Harris | G06F 16/9535 |
| | | | 715/758 |
| 2014/0019888 A1* | 1/2014 | Paniagua | G06F 3/0484 |
| | | | 715/760 |
| 2016/0021213 A1* | 1/2016 | Ruan | H04L 65/40 |
| | | | 709/204 |
| 2016/0092940 A1* | 3/2016 | Gupta | G06Q 30/0277 |
| | | | 705/14.73 |
| 2016/0170592 A1* | 6/2016 | DeLuca | G06F 3/0483 |
| | | | 715/777 |
| 2016/0283984 A1* | 9/2016 | Rabbat | G06Q 30/0269 |
| 2016/0364100 A1* | 12/2016 | Nakasone | B60K 35/60 |
| 2017/0300211 A1* | 10/2017 | Wang | G06F 9/451 |
| 2017/0372364 A1* | 12/2017 | Andreou | G06F 3/04845 |
| 2018/0004753 A1* | 1/2018 | Chatterjee | G06Q 50/01 |
| 2018/0276559 A1* | 9/2018 | Kodali | G06F 16/2455 |
| 2018/0349485 A1* | 12/2018 | Carlisle | G06F 16/9535 |
| 2019/0073100 A1* | 3/2019 | Li | G06F 3/0483 |
| 2019/0138174 A1* | 5/2019 | Deets, Jr. | H04M 1/7243 |
| 2019/0392471 A1* | 12/2019 | Rodriguez Cardona | ............... |
| | | | H04W 4/021 |
| 2022/0058693 A1* | 2/2022 | Jang | G06Q 30/0269 |
| 2022/0092712 A1* | 3/2022 | Geurts | H04L 67/10 |
| 2022/0231982 A1* | 7/2022 | Hwang | H04L 51/10 |
| 2023/0004268 A1* | 1/2023 | Jiao | G06F 3/0481 |
| 2023/0130438 A1* | 4/2023 | Liang | G06F 3/0484 |
| | | | 715/716 |
| 2023/0229463 A1* | 7/2023 | Huang | G06F 9/451 |
| | | | 718/102 |
| 2023/0230178 A1* | 7/2023 | Yoon | G06F 3/0483 |
| | | | 715/738 |

\* cited by examiner

METHOD, COMPUTER DEVICE, AND NON-TRANSITORY COMPUTER-READABLE RECORDING MEDIUM TO PROVIDE DYNAMIC LANDING PAGE FOR SOCIAL PLATFORM

CROSS-REFERENCE TO RELATED APPLICATION(S)

This U.S. non-provisional application and claims the benefit of priority under 35 U.S.C. § 119 to Korean Patent Application No. 10-2022-0006027, filed Jan. 14, 2022, the entire contents of which are incorporated herein by reference in their entirety.

BACKGROUND

Technical Field

Some example embodiments relate to technology for providing a landing page of a social platform.

Related Art

A social platform, such as a social network service (SNS) and a messenger, supports interaction through posts by forming a relationship between users.

The social platform may provide information to each user in different context. For example, the social platform may provide update information on a connection relationship of a corresponding user, post update information, content recommendation, and various types of information items.

For example, conventionally, posts may be managed using an SNS. Some of social platforms provide a view form capable of reading posts as a timeline type. Currently, a timeline-type post display method is generally used for personal communication with rapid content update and consumption. However, such conventional technology may not dynamically provide a landing page of a social platform according to presence or absence of a new post.

SUMMARY

Some example embodiments may dynamically provide a landing page of a social platform according to presence or absence of a new post.

Some example embodiments may provide a post update notification of a relationship-based following feed while browsing a personalization-based recommended feed.

Some example embodiments may display a recommended post through a following feed tab or may display a recommend module for inducing landing to a recommended feed tab.

Some example embodiments may dynamically determine a display location of a recommend module based on a new post in a following feed tab.

According to an aspect of at least one example embodiment, there is provided a method of generating a social platform service screen using a computer device such that the social platform service screen includes a recommended feed tab and a following feed tab, the recommended feed tab configured to display a personalization-based recommended post and the following feed tab configured to display relationship-based following posts contained within a following feed.

In some example embodiments, the method includes directing, by at least one processor of the computer device, the social platform service screen to land on one of the recommended feed tab and the following feed tab according to a situation associated with the social platform service screen at an entry request point in time.

In some example embodiments, the directing includes verifying whether a new post is present in the following feed at the entry request point in time; directing the social platform service screen to land on the recommended feed tab when the new post is absent in the following feed at the entry request point in time; and directing the social platform service screen to land on the following feed tab when the new post is present in the following feed at the entry request point in time.

In some example embodiments, the method further includes displaying a post update notification on the social platform service screen when a new post is updated to the following feed while a user is browsing the recommended feed tab.

In some example embodiments, the displaying includes displaying a dot-type notification as the post update notification in a tab menu area that represents the following feed tab on the social platform service screen.

In some example embodiments, the displaying includes displaying a floating-button-type notification as the post update notification on the social platform service screen.

In some example embodiments, the method further includes generating a recommendation window within the following feed tab, the recommendation window configured to induce landing to the personalization-based recommended post or the recommended feed tab while a user is browsing the following feed tab.

In some example embodiments, the method further includes modifying the following feed tab to display the personalization-based recommended post instead of displaying one of the relationship-based following posts unless a new post has been updated to the following feed within a desired period of time.

In some example embodiments, the generating includes generating the recommendation window includes determining a display location of the recommendation window based on an unseen post among the relationship-based following posts.

In some example embodiments, the generating the recommendation window includes displaying the recommendation window below an unseen post and above a seen post among the relationship-based following posts.

In some example embodiments, the method further includes determining a display location of each of an advertisement and the recommendation window based on an unseen post among the relationship-based following posts when displaying the advertisement through the following feed tab.

Some other example embodiments are directed to a non-transitory computer-readable recording medium including instructions that, when executed by a processor, cause the processor to perform the method of generating a social platform service screen.

Some other example embodiments are directed to a computer device.

In some example embodiments, the computer device includes a memory configured to store computer-readable instructions; and at least one processor configured to execute the computer-readable instructions to configure the computer device to, provide a social platform service screen including a recommended feed tab and a following feed tab, the recommended feed tab configured to display a personalization-based recommended post and the following feed tab configured to display relationship-based following posts contained within a following feed, and direct the social platform service screen to land on one of the recommended feed tab and the following feed tab according to a situation associated with the social platform service screen at an entry request point in time.

In some example embodiments, the computer device is configured to, verify whether a new post is present in the following feed at the entry request point in time, direct the social platform service screen to land on the recommended feed tab when the new post is absent in the following feed at the entry request point in time, and direct the social platform service screen to land on the following feed tab when the new post is present in the following feed at the entry request point in time.

In some example embodiments, the at least one processor is configured to display a post update notification on the social platform service screen when a new post is updated to a following feed while a user is browsing the recommended feed tab.

In some example embodiments, the at least one processor is configured to display a dot-type notification as the post update notification in a tab menu area that represents the following feed tab on the social platform service screen.

In some example embodiments, the at least one processor is configured to display a floating-button-type notification as the post update notification on the social platform service screen.

In some example embodiments, the at least one processor is configured to generate a recommendation window within the following feed tab, the recommendation window configured to induce landing to the personalization-based recommended post or the recommended feed tab while a user is browsing the following feed tab.

In some example embodiments, the at least one processor is configured to modify the following feed tab to display the personalization-based recommended post instead of displaying the relationship-based following posts unless a new post has been updated to the following feed within a desired period of time.

In some example embodiments, the at least one processor is configured to determine a display location of the recommendation window based on an unseen post among the relationship-based following posts.

In some example embodiments, the at least one processor is configured to determine a display location of each of an advertisement and the recommendation window based on an unseen post among the relationship-based following posts when displaying the advertisement through the following feed tab.

Further areas of applicability will become apparent from the description provided herein. The description and specific examples in this summary are intended for purposes of illustration only and are not intended to limit the scope of the present disclosure.

DETAILED DESCRIPTION

Figure 1:
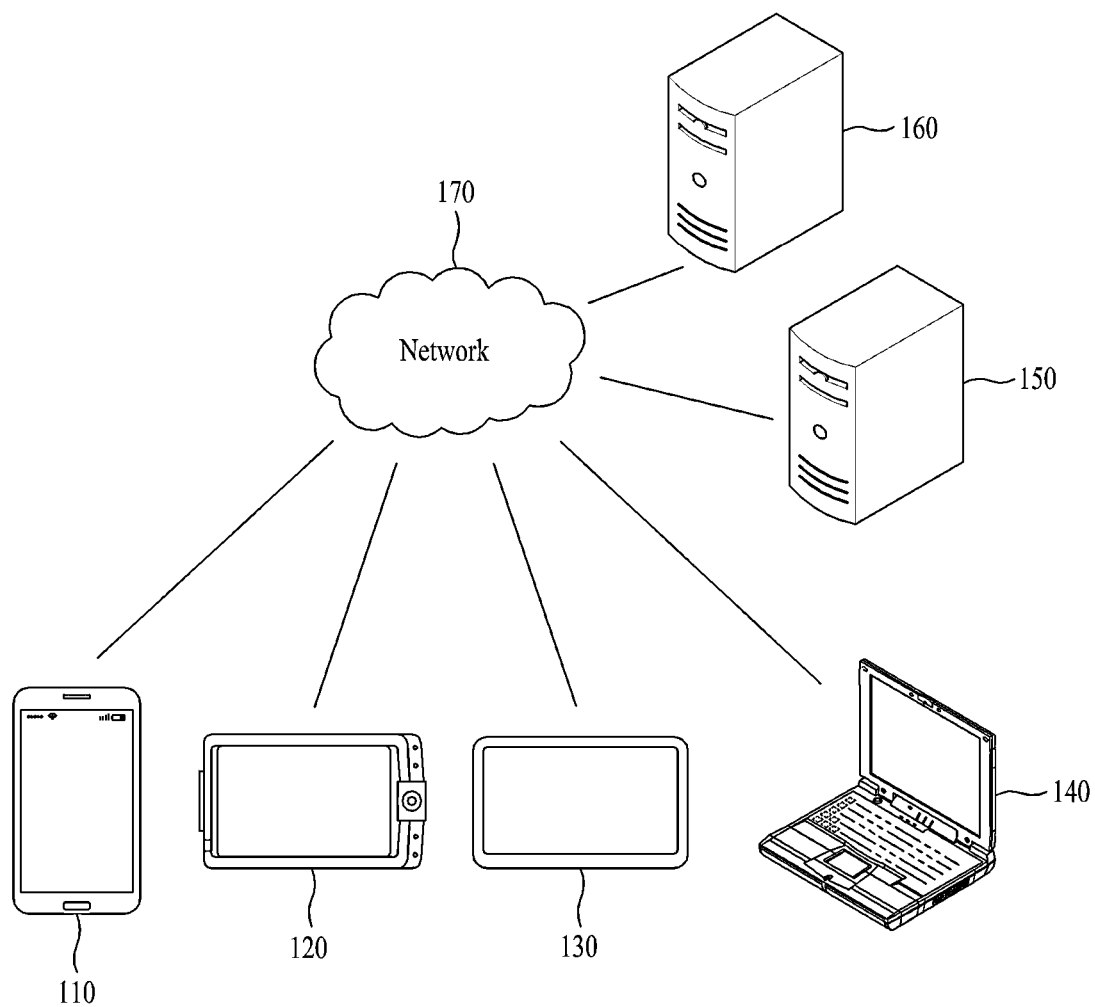
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher-level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Hereinafter, some example embodiments will be described with reference to the accompanying drawings.

Some example embodiments relate to technology for providing a landing page of a social platform.

The example embodiments including disclosures herein may provide a post as a consumption-oriented feed view in a social platform.

A post providing system according to some example embodiments may be implemented by at least one computer device. A post providing method according to some example embodiments may be performed by at least one computer device included in a post providing system. Here, a computer program according to an example embodiment may be installed and run on the computer device and the computer device may perform the post providing method according to example embodiments under control of the computer program. The aforementioned computer program may be stored in a computer-readable recording medium to implement the post providing method in conjunction with the computer device.

FIG. 1 illustrates an example of a network environment according to at least one example embodiment.

Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto. Also, the network environment of FIG. 1 is provided as one example of environments applicable to the example embodiments and an environment applicable to the example embodiments is not limited to the network environment of FIG. 1.

Each of the plurality of electronic devices 110, 120, 130, and 140 may be a fixed terminal or a mobile terminal that is configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, and the like. For example, although FIG. 1 illustrates a shape of a smartphone as an example of the electronic device 110, the electronic device 110 used herein may refer to one of various types of physical computer devices capable of communicating with other electronic devices 120, 130, and 140, and/or the servers 150 and 160 over the network 170 in a wireless or wired communication manner.

The communication scheme is not limited and may include a near field wireless communication scheme between devices as well as a communication scheme using a communication network (e.g., a mobile communication network, wired Internet, wireless Internet, and a broadcasting network.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer device or a plurality of computer devices that provides an instruction, a code, a file, content, a service, etc., through communication with the plurality of electronic devices 110, 120, 130, and 140 over the network 170. For example, the server 150 may be a system that provides a service, for example, a timeline service, to the plurality of electronic devices 110, 120, 130, and 140 connected over the network 170.

Figure 2:
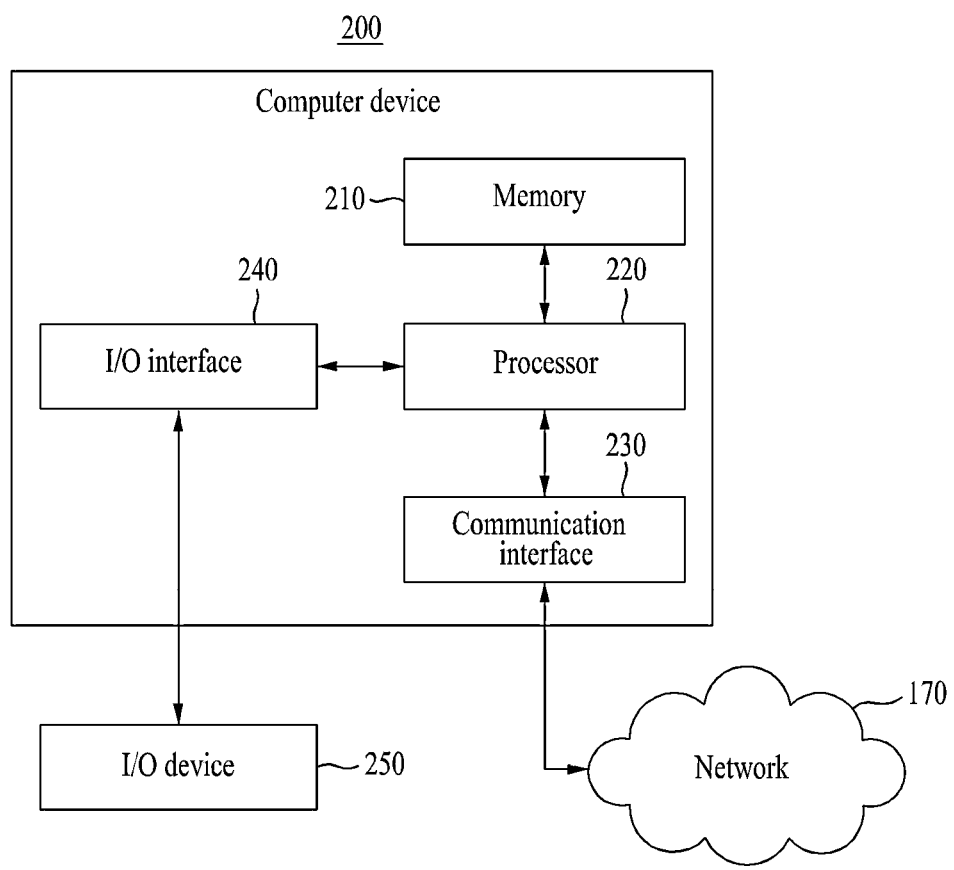
FIG. 2 is a diagram illustrating an example of a computer device according to at least one example embodiment.

FIG. 2 is a block diagram illustrating an example of a computer device according to at least one example embodiment. Each of the plurality of electronic devices 110, 120, 130, and 140 or each of the servers 150 and 160 may be implemented by a computer device 200 of FIG. 2.

Referring to FIG. 2, the computer device 200 may include a memory 210, a processor 220, a communication interface 230, and an input/output (I/O) interface 240. The memory 210 may include a permanent mass storage device, such as a random access memory (RAM), a read only memory (ROM), and a disk drive, as a non-transitory computer-readable recording medium. However, example embodiments are not limited thereto. The permanent mass storage device, such as the ROM or the disk drive, may be included in the computer device 200 as a permanent storage device separate from the memory 210. Also, an OS and at least one program code may be stored in the memory 210. Such software components may be loaded to the memory 210 from another non-transitory computer-readable recording medium separate from the memory 210. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 210 through the communication interface 230, instead of the non-transitory computer-readable recording medium. For example, the software components may be loaded to the memory 210 of the computer device 200 based on a computer program installed by files received over the network 170.

The processor 220 may be configured to process instructions of a computer program by performing basic arithmetic operations, logic operations, and I/O operations. The computer-readable instructions may be provided by the memory 210 or the communication interface 230 to the processor 220. For example, the processor 220 may be configured to execute received instructions in response to a program code stored in a storage device, such as the memory 210.

The computer device 200 may include various processing circuitry including logic circuits; a hardware/software combination such as the processor 220 executing software stored on the memory 210. For example, the processing circuitry more specifically may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc. The processing circuitry may execute software including a plurality of instructions that transform the processing circuitry into special purpose processing circuitry to dynamically provide a landing page of a social platform by selectively directing the social platform service to land on one of a recommended feed tab and a following feed tab based on, for example whether new posts are present within the following feed at the entry point in time. Therefore, the special purpose processing circuitry may improve the functioning of the computer device 200 by generating a graphical user interface (GUI) that provides a tab landing more suitable for consuming posts in consideration of a situation at the timeline entry request point in time.

The communication interface 230 may provide a function for communication between the communication device 200 and another apparatus, for example, the aforementioned storage devices. For example, the processor 220 of the computer device 200 may forward a request or an instruction created based on a program code stored in the storage device such as the memory 210, data, and a file, to other apparatuses over the network 170 under control of the communication interface 230. Inversely, a signal, an instruction, data, a file, etc., from another apparatus may be received at the computer device 200 through the communication interface 230 of the computer device 200. For example, a signal, an instruction, data, etc., received through the communication interface 230 may be forwarded to the processor 220 or the memory 210, and a file, etc., may be stored in a storage medium, for example, the permanent storage device, further includable in the computer device 200.

The I/O interface 240 may be a device used for interfacing with an I/O device 250. For example, an input device may include a device, such as a microphone, a keyboard, a mouse, etc., and an output device may include a device, such as a display, a speaker, etc. As another example, the I/O interface 240 may be a device for interfacing with an apparatus in which an input function and an output function are integrated into a single function, such as a touchscreen. The I/O device 250 may be configured as a single apparatus with the computer device 200.

Also, according to other example embodiments, the computer device 200 may include a greater or smaller number of components than the number of components of FIG. 2. However, there is no need to clearly illustrate many conventional components. For example, the computer device 200 may be configured to include at least a portion of the I/O device 250 or may further include other components, such as a transceiver and a database.

Hereinafter, a method and system for dynamically providing a landing page of a social platform according to some example embodiments will be described.

The example embodiments may provide a post of an account having a follow-based subscription relationship with a user as a timeline and may recommend a personalization-based post for the user in such a timeline service.

The timeline service herein refers to a kind of a community space in the relationship-based Internet, such as a messenger, and also represents a social platform that provides a view type of a post as a timeline type.

Without being limited to the timeline service, the example embodiments may expand and apply to any communication space that allows communication through various communication functions.

The computer device 200 according to the example embodiment may provide a client with a timeline service through connection to an exclusive application installed on the client or a website/mobile site related to the computer device 200. A post providing system implemented as a computer may be configured in the computer device 200. For example, the post providing system may be implemented in a form of a program that independently operates or may be configured to operate within another specific application, such as a web browser.

The processor 220 of the computer device 200 may be implemented as a component to perform the following post providing method. Depending on example embodiments, components of the processor 220 may be selectively included in or excluded from the processor 220. Also, depending on example embodiments, the components of the processor 220 may be separated or merged for functional representation of the processor 220.

The processor 220 and the components of the processor 220 may control the computer device 200 to perform operations included in the following post providing method. For example, the processor 220 and the components of the processor 220 may be configured to execute an instruction according to a code of at least one program and a code of an OS included in the memory 210.

Here, the components of the processor 220 may be representations of different functions performed by the processor 220 in response to an instruction provided from a program code stored in the computer device 200.

The processor 220 may read a necessary instruction from the memory 210 to which instructions related to control of the computer device 200 are loaded. In this case, the read instruction may include an instruction for controlling the processor 220 to perform the following operations.

Operations included in the following post providing method may be performed in order different from illustrated order. Some of the operations may be omitted or an additional process may be further included.

Operations included in the post providing method may be performed by, for example, a client on which a messenger is installed. Depending on example embodiments, some of operations may be performed by the server 150.

Figure 3:
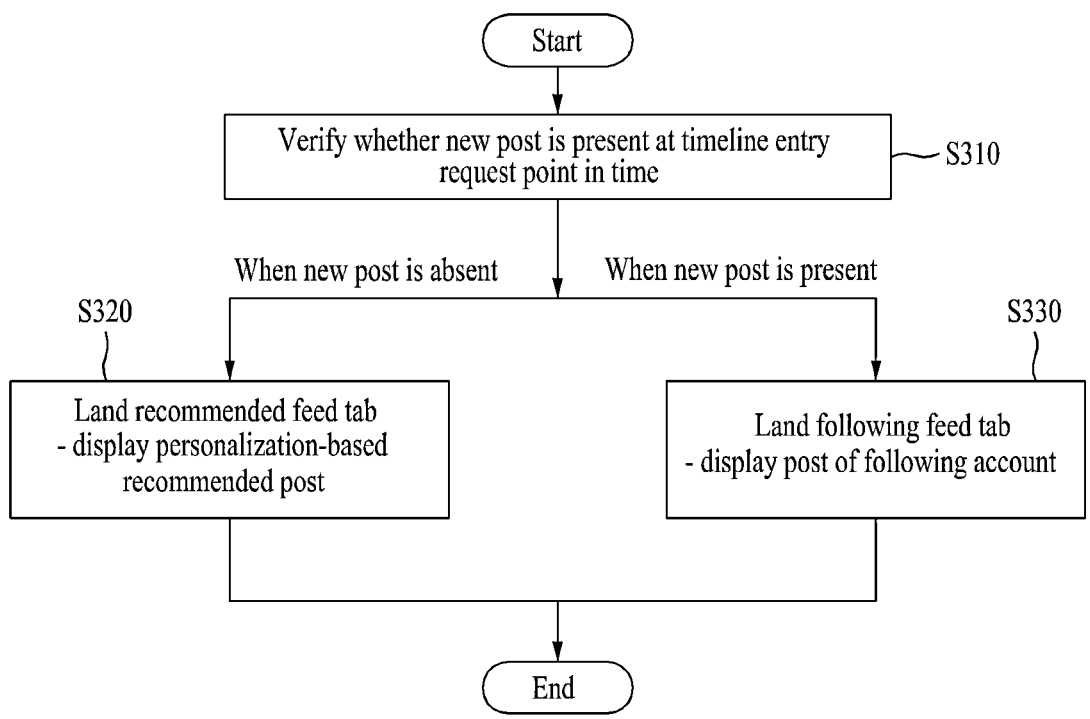
FIG. 3 is a flowchart illustrating an example of a method performed by a computer device according to at least one example embodiment.

FIG. 3 is a flowchart illustrating a method of performed by a computer device according to at least one example embodiment.

The example embodiments may configure at least two tab screens as a timeline service screen and may provide the same. For example, the timeline service screen may include a recommended feed tab for displaying a personalization-based recommended post and a following feed tab for displaying a post of a following account of a user according to a follow-based subscription relationship.

Referring to FIG. 3, in operation S310, in response to receiving an entry request for a timeline service, the processor 220 may verify whether a new post unread, that is, unseen by a user is present in a feed in which a post is updated based on a subscription relationship of the user, that is, a following feed. That is, the processor 220 may verify whether there exists a new post associated with an account that the user is following based on the subscription relationship of the user at a timeline entry request point in time.

In operation S320, when the new post is absent in the following feed at the timeline entry request point in time, the processor 220 may land the recommended feed tab such that a personalization-based recommended post may be first consumed at the time of entry into the timeline. The processor 220 may display at least some recommended posts among posts included in a personalization pool of the user by using the recommended feed tab as a landing page at the time of entry into the timeline. The landing page may be a destination the user is directed to visit at the timeline entry request point in time after, for example, clicking on one of the recommended feed tab 410 and the following feed tab 420. Landing may refer to the act of directing (or, alternatively, re-directing) the user to the landing page. For example, the processor 220 may cause the timeline service screen 400 to land on a particular feed tab by activating the particular feed tab as the landing page.

Here, the processor 220 may configure a personalization pool specified for each user based on a user history in the timeline service to provide a personalization-based recommended post. For example, the processor 220 may select, as a seed post, a post clicked by the user, a post in which the user inputs a reaction, such as a comment or like, a post shared by the user, according to a user log for a corresponding post and may configure a set of posts similar to the corresponding seed post based on a similarity with the seed post as a personalization pool of the corresponding user. The personalization pool may include a popularity-based recommendation pool. Here, the processor 220 may configure the popularity-based recommendation pool by selecting a post having a popularity score of a desired level or more for a recent desired period of time (e.g., a week, a month, etc.). For example, a like count or a view count may be used as a popularity index for a post and the popularity-based recommendation pool may be configured using posts with high popularity through such indicators.

In operation S330, when at least one new post is present in the following feed at the timeline entry request point in time, the processor 220 may land the following feed tab such that a subscription relationship-based new post may be first consumed at the time of entry into the timeline. The processor 220 may display a post of a following account of the user by using the following feed tab as the landing page at the time of entry into the timeline. Here, the processor 220 may sort and provide posts of an account having a follow-based subscription relationship with the user in order of a most recent time according to a post registration point in time through the following feed tab.

Therefore, the processor 220 may provide a tab landing more suitable for consuming posts in consideration of a situation at the timeline entry request point in time.

Figure 4:
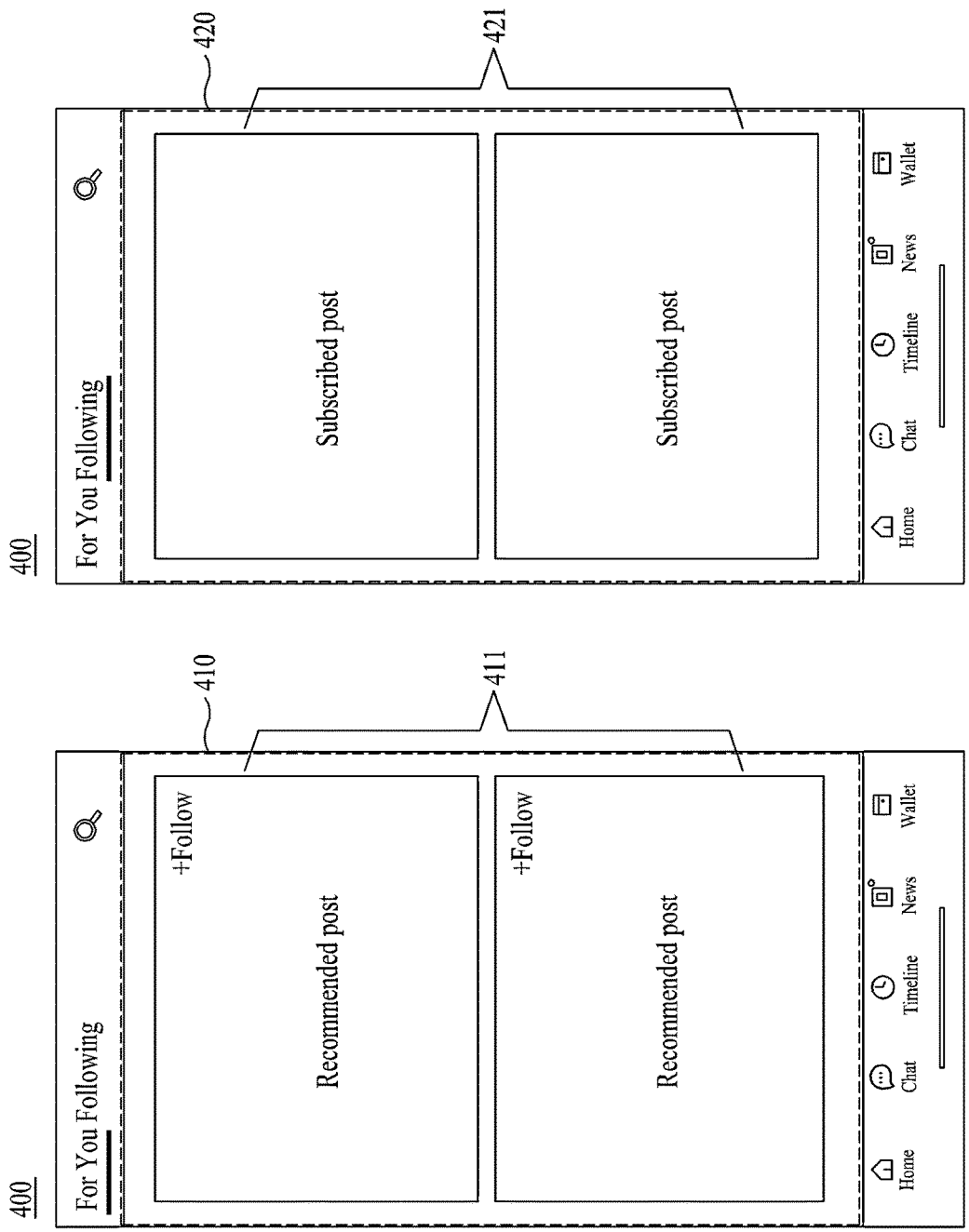
FIG. 4 illustrates an example of a timeline service screen according to at least one example embodiment.

FIG. 4 illustrates an example of a timeline service screen according to at least one example embodiment.

Referring to FIG. 4, a timeline service screen 400 may include a recommended feed tab 410 for providing a personalization-based recommended post 411 and a following feed tab 420 for providing a relationship-based subscribed post 421.

When an updated new post is absent in a following feed based on a timeline entry request point in time of a user, the processor 220 may activate the recommended feed tab 410 as a landing page when entering the timeline service screen 400 and may display the recommended posts 411.

That is, the processor 220 may land the recommended feed tab 410 at the time of entry into the timeline service screen 400 such that the recommended posts 411 may be first consumed when a new post is absent in the following feed.

For example, in the case of the recommended feed tab 410, the processor 220 may select and provide a video post as the recommended post 411. Here, a video post to be selected as the recommended post 411 may include all of a short-formatted video post and a long-formatted video post. If at least two videos are included in a single video post, a first attached video may be displayed in a list of posts of the recommended feed tab 410.

Therefore, when a new post is absent in the following feed at the timeline entry point in time, the processor 220 may land a video-intensive-consumption-oriented feed view that may first consume a recommended video post through personalization.

Meanwhile, when an updated new post is present in the following feed based on the timeline entry request point in time of the user, the processor 220 may activate the following feed tab 420 as the landing page when entering the timeline service screen 400 and may display the subscribed posts 421.

That is, when a new post is present in the following feed at the time of entry into the timeline service screen 400, the processor 220 may immediately land the following feed tab 420 for easy access to the new post.

Figure 5:
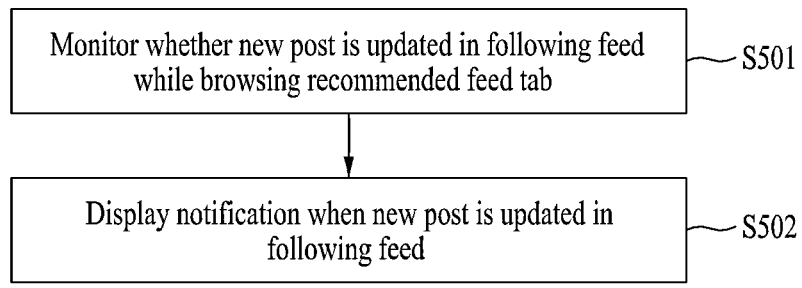
FIG. 5 is a flowchart illustrating an example of a process of providing a new post update notification according to at least one example embodiment.

FIG. 5 is a flowchart illustrating an example of a process of providing a new post update notification according to at least one example embodiment.

Referring to FIG. 5, in operation S501, the processor 220 may monitor whether a new post is updated in the following feed periodically or in real time while browsing posts through the recommended feed tab 410.

In operation S502, when the new post is updated in the following feed while browsing the recommended feed tab 410, the processor 220 may display a new post update notification on the timeline service screen 400.

Figure 6:
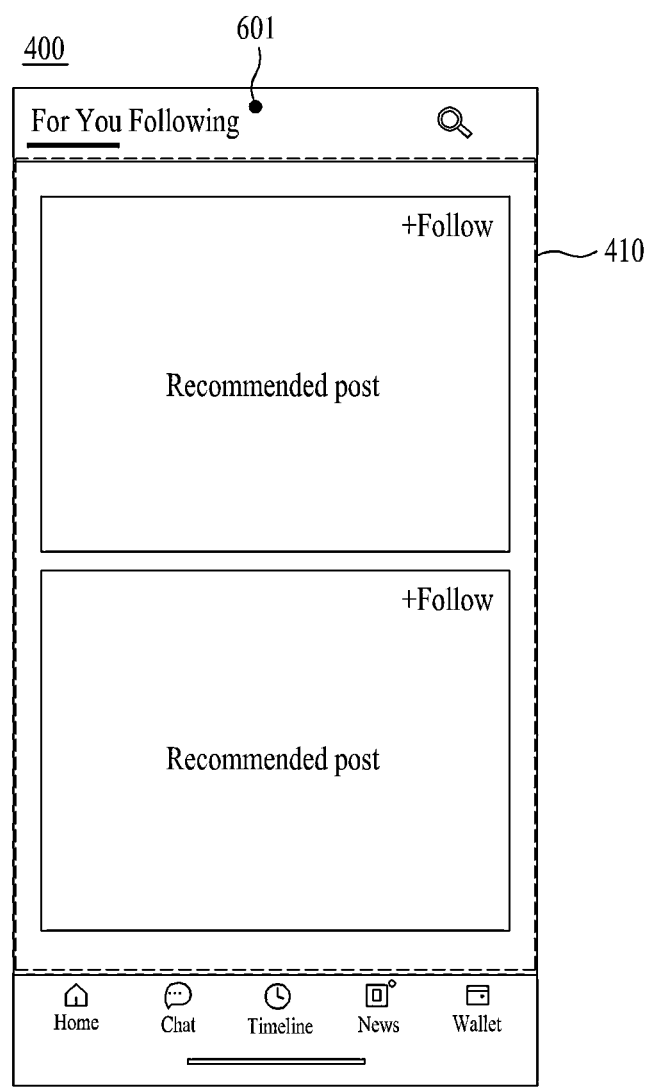
FIGS. 6 and 7 illustrate examples of displaying a new post update notification according to at least one example embodiment.
Figure 7:
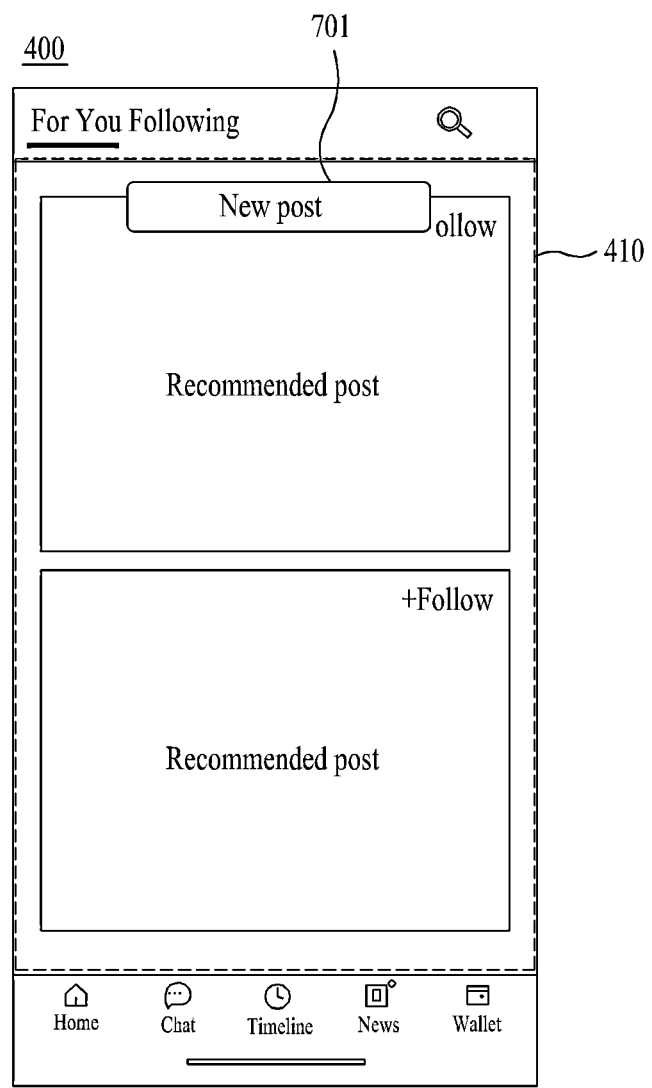

FIGS. 6 and 7 illustrate examples of displaying a new post update notification according to at least one example embodiment.

For example, referring to FIG. 6, when a new post is updated in a following feed while browsing the recommended feed tab 410, the processor 220 may display a dot-type notification 601 in a tab menu area that represents the following feed tab 420 in an upper end tab menu area of the timeline service screen 400.

As another example, referring to FIG. 7, when a new post is updated in a following feed while browsing the recommended feed tab 410, the processor 220 may display a notification 701 in a form of a floating button on the timeline service screen 400.

In a state in which the timeline service screen 400 is active, the processor 220 may generate the new post update notification, for example, the notifications 601 and 701, only under a condition that a new post is updated in the following feed while browsing the recommended feed tab 410.

The processor 220 may remove the new post update notification, for example, the notifications 601 and 701, which is in a displayed state, at the time of entry into the following feed tab 420.

In the case of entering the following feed tab 420 after the new post update notification, for example, the notifications 601 and 701, the processor 220 may display a display element for distinguishing a new post unseen by the user from a post already seen.

Therefore, the processor 220 may display the new post update notification, for example, the notifications 601 and 701, of the following feed while browsing the recommended feed tab 410, which may lead to inducing a visit to the following feed tab 420 and extending an amount of time used to consume posts on a timeline service.

Also, the processor 220 may provide a recommended post through the following feed tab 420 or may provide a recommend module (or, alternatively a recommend window) for inducing landing to the recommended feed tab 410.

Figure 8:
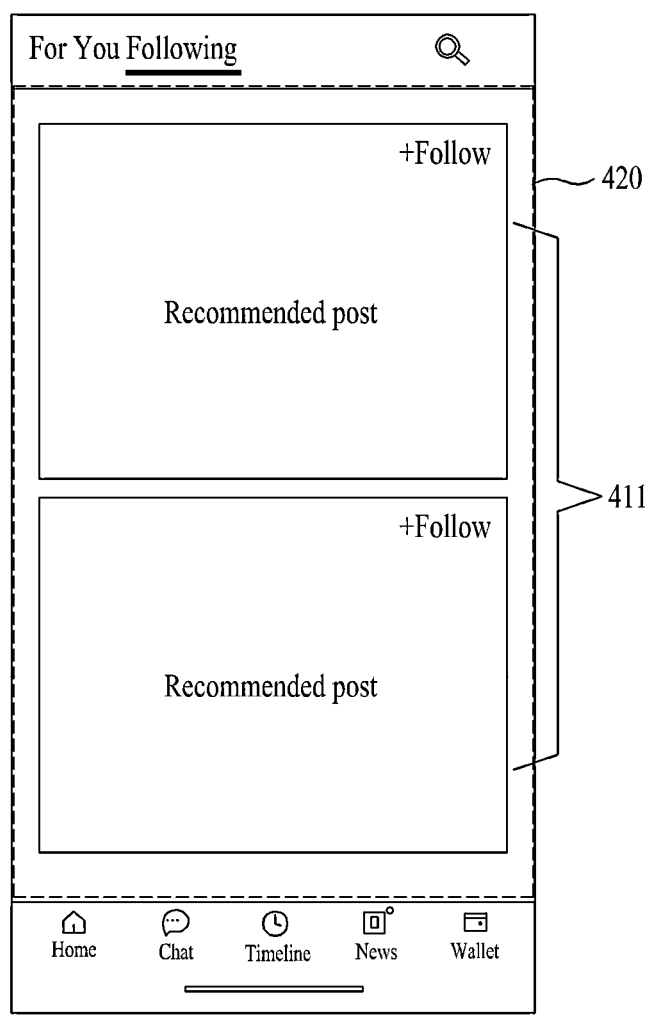
FIGS. 8 and 9 illustrate examples of a following feed view capable of consuming recommended posts according to at least one example embodiment.

For example, referring to FIG. 8, for a user that has not updated a new post in a following feed for a desired period of time or more, for example, 48 hours, the processor 220 may display the personalization-based recommended post 411 instead of displaying the relationship-based subscribed post 421 through the following feed tab 420.

Although the user does not have a following account or there is no post registered to a following account of the user, the processor 220 may display not the subscribed post 421 but the recommended post 411 through the following feed tab 420.

When displaying the recommended post 411 using the following feed tab 420, the processor 220 may display the recommended post 411 in the same layout as that of the subscribed post 421 and may also display a label capable of identifying the recommended post 411.

As another example, the processor 220 may mix and thereby display the subscribed post 421 and the recommended post 411 through the following feed tab 420. Here, the processor 220 may determine the number of recommended posts 411 based on, for example, the number of and the age of the subscribed posts 421 included in the following feed.

For example, if a post updated in a previous period as the subscribed post 421 is present, but there is no new post updated in a recent period, the processor 220 may display, for example, fifteen (15) recommended posts 411. If there is no subscribed post 421 because there is no following account of the user, the processor 220 may display more recommended posts 411, for example, twenty (20) recommended posts 411.

Figure 9:
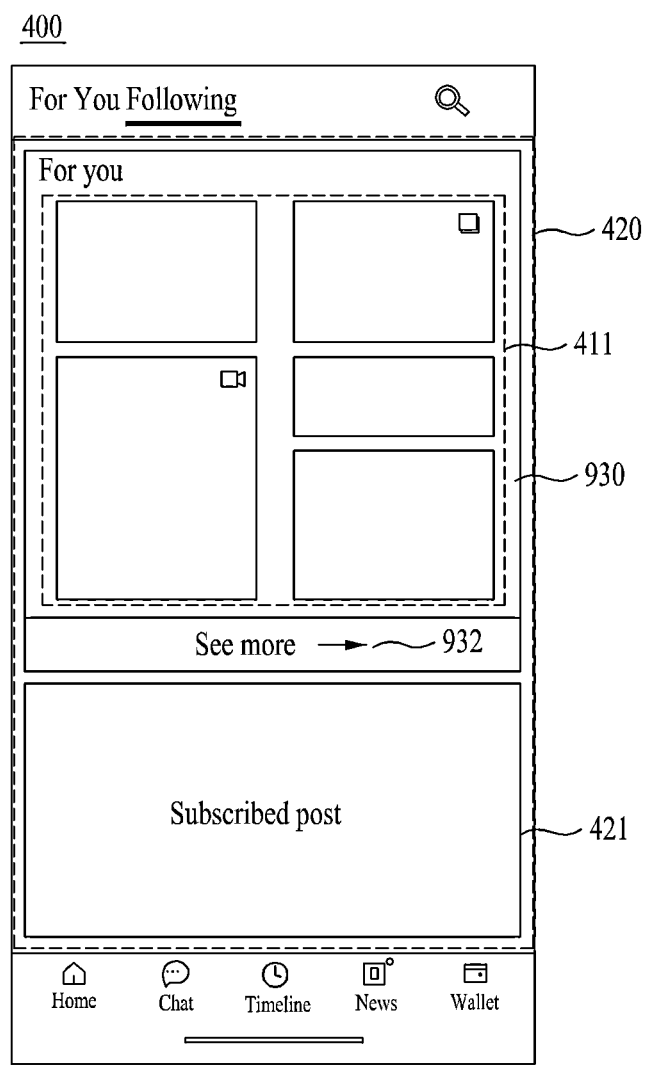

As another example, referring to FIG. 9, the processor 220 may display the relationship-based subscribed post 421 through the following feed tab 420 and may also provide a recommend module 930 for inducing landing to the recommended feed tab 410.

The recommend module 930 on the following feed tab 420 may sort and display the personalization-based recommended posts 411 in a form of a collage view and may also provide a tab navigation interface 932 for navigating to the recommended feed tab 410.

Therefore, the processor 220 may provide a feed view capable of consuming not only the relationship-based subscribed post 421 but also the personalization-based recommended post 411 while the user has landed on the following feed tab 420.

Figure 10:
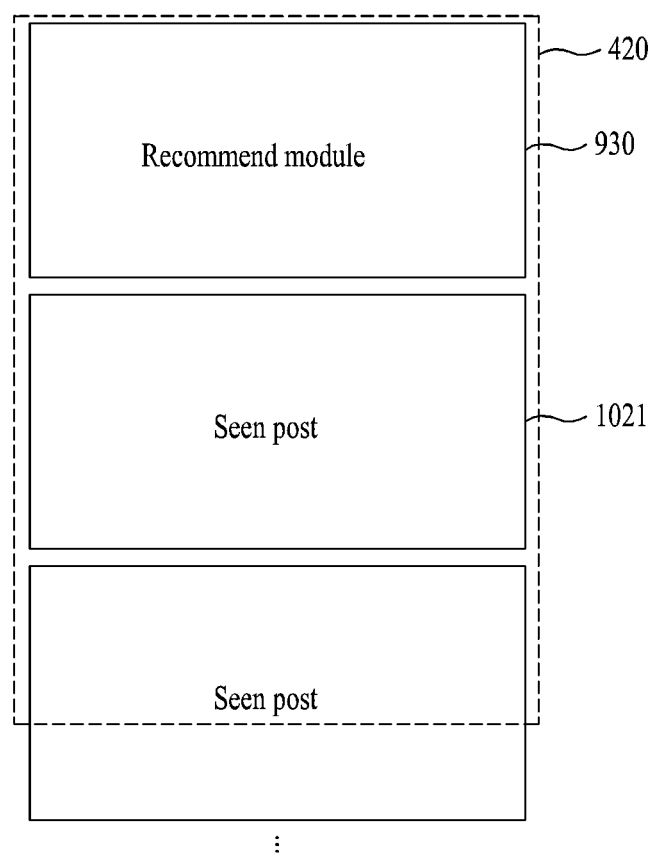
FIGS. 10 to 12 illustrate examples of a display location of a recommend module according to at least one example embodiment.
Figure 11:
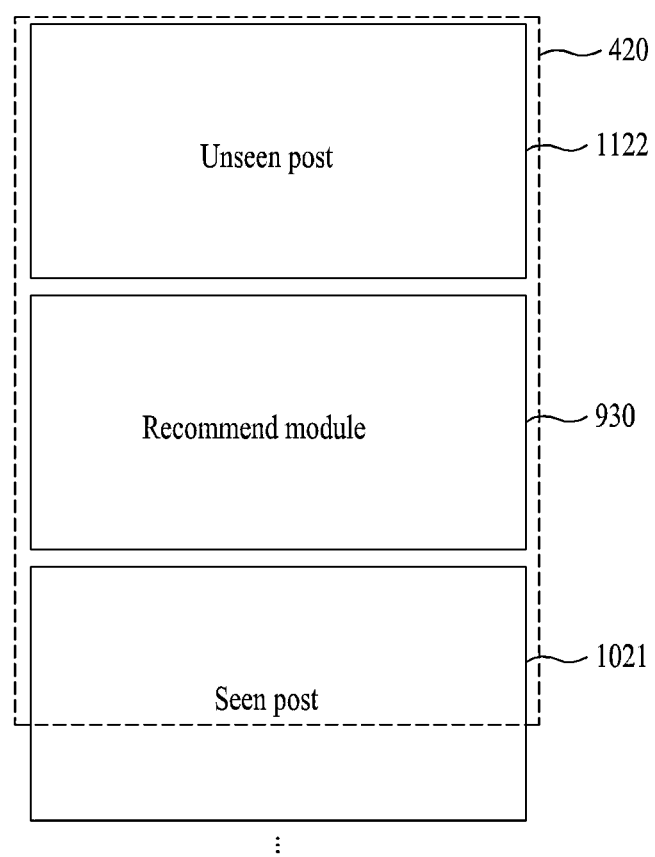
Figure 12:
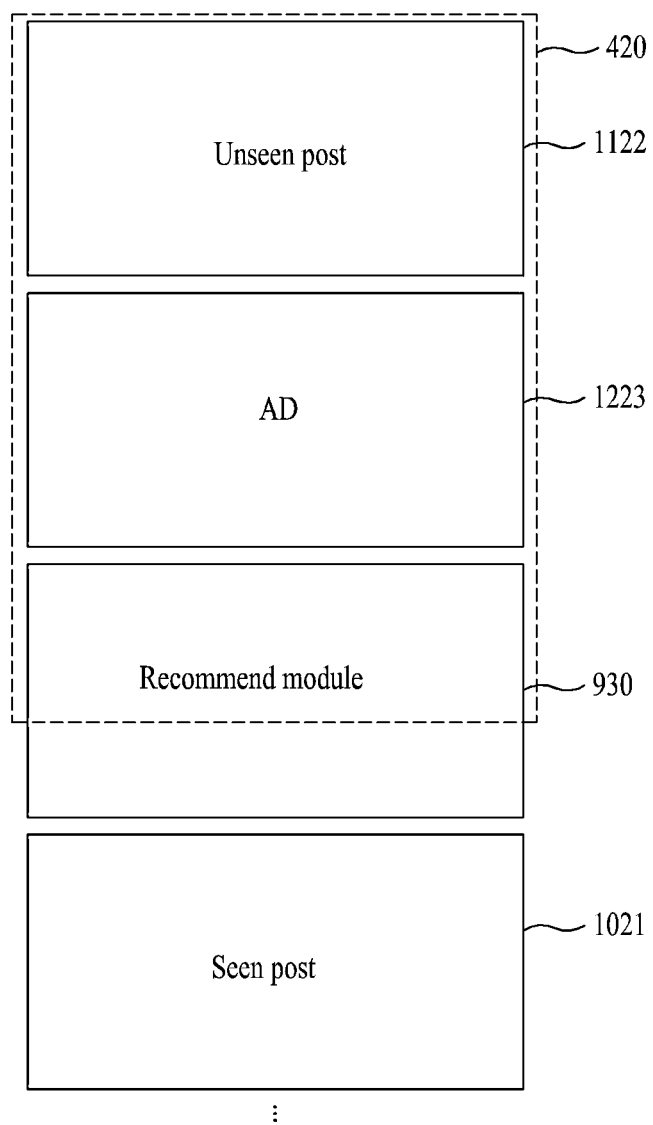

FIGS. 10 to 12 illustrate examples of a display location of a recommend module according to at least one example embodiment.

The processor 220 may determine a display location of the recommend module 930 based on a new post unread by the user, that is, an unseen post among the subscribed posts 421 on the following feed tab 420.

For example, for a user that does not have a new post updated as the subscribed post 421, the processor 220 may place the recommend module 930 at a top end of the following feed tab 420 and then provide the recommend module 930 after the new post on the following feed tab 420.

Referring to FIG. 10, when all the subscribed posts 421 displayed on the following feed tab 420 correspond to seen posts 1021 that are already read by the user, the processor 220 may place and display the recommend module 930 at the top end of the following feed tab 420.

Referring to FIG. 11, when an unseen post 1122 that is unread by the user is present among the subscribed posts 421 on the following feed tab 420, the processor 220 may place and display the recommend module 930 at a lower end that, that is, below the unseen post 1122.

Here, the processor 220 may place the recommend module 930 at the lower end that, that is, below the unseen post 1122 and at an upper end than, that is, above the seen post 1021 on the following feed tab 420.

Referring to FIG. 12, when an advertising post (AD) 1223 is displayed on the following feed tab 420, the processor 220 may display a display location of each of the advertising post 1223 and the recommend module 930 based on the number of unseen posts 1122.

When at least one unseen post 1122 is included in the subscribed posts 421 on the following feed tab 420, the processor 220 may place and display the recommend module 930 below the advertising post 1223.

When there is no unseen post 1122 among the subscribed posts 421 on the following feed tab 420, the processor 220 may place and display the recommend module 930 above the advertising post 1223.

That is, the processor 220 may place the advertising post 1223 and the recommend module 930 below the unseen post 1122 and above the seen post 1021 on the following feed tab 420.

Therefore, the processor 220 may dynamically determine a location of the recommend module 930 to be displayed on the following feed tab 420 based on the number of unseen posts 1122.

According to some example embodiments, it is possible to dynamically provide a landing page of a timeline service screen according to presence or absence of a new post and to provide a new post update notification of a relationship-based following feed while browsing a personalization-based recommended feed.

The apparatuses described above may be implemented using hardware components, software components, and/or a combination thereof. For example, the apparatuses and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied in any type of machine, component, physical equipment, a computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to some example embodiments may be configured in a form of program instructions performed through various computer methods and recorded in non-transitory computer-readable media. The media may continuously store computer-executable programs or may temporarily store the same for execution or download. Also, the media may be various types of recording devices or storage devices in a form in which one or a plurality of hardware components are combined. Without being limited to media directly connected to a computer device, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations, other example embodiments, and equivalents are within the scope of the following claims.

What is claimed is:

1. A method of generating a social platform service screen using a computer device such that the social platform service screen includes a recommended feed tab for a first user and a following feed tab for the first user, the recommended feed tab configured to display a personalization-based recommended post for the first user and the following feed tab configured to display relationship-based following posts uploaded by at least one second user having a subscription relationship with the first user contained within a following feed, the method comprising:
   receiving, by at least one processor of the computer device, an entry request from the first user at an entry request point in time, the entry request requesting entry into the social platform service screen; and
   directing, by at least one processor of the computer device, the social platform service screen for the first user to initially land, in response to the entry request, on one of the recommended feed tab and the following feed tab selected based on whether a new post uploaded by the second user is present in the following feed at the entry request point in time, the directing including:
   determining, by the at least one processor, whether the new post uploaded is present in the following feed at the entry request point in time,
   directing the social platform service screen to initially land on the recommended feed tab and displaying the personalization-based recommended post uploaded by at least one third user without the subscription relationship with the first user through the recommended feed tab, in response to a first determination that the new post is absent in the following feed at the entry request point in time, and
   in response to a second determination that the new post is present in the following feed at the entry request point in time:
      directing the social platform service screen to initially land on the following feed tab and displaying at least one of the relationship-based following posts through the following feed tab;
      determining, by the at least one processor, whether the following feed lacks a new post update for a set period of time after the latest post uploaded by the second user is updated to the following feed; and
      displaying the personalization-based recommended post on a first area of the following feed tab higher than a second area of the following feed tab where the relationship-based following posts are simultaneously displayed in response to the third determination determining that the following feed lacks the new post update for the set period of time.

2. The method of claim 1, further comprising: displaying a post update notification on the social platform service screen when a new post is updated to the following feed while a user is browsing the recommended feed tab.

3. The method of claim 2, wherein the displaying comprises: displaying a dot-type notification as the post update notification in a tab menu area that represents the following feed tab on the social platform service screen.

4. The method of claim 2, wherein the displaying comprises: displaying a floating-button-type notification as the post update notification on the social platform service screen.

5. The method of claim 1, further comprising: generating a recommendation window within the following feed tab, the recommendation window configured to induce landing to the personalization-based recommended post or the recommended feed tab while a user is browsing the following feed tab.

6. The method of claim 5, wherein generating the recommendation window comprises: determining a display location of the recommendation window based on an unseen post among the relationship-based following posts.

7. The method of claim 5, wherein generating the recommendation window comprises: displaying the recommendation window below an unseen post and above a seen post among the relationship-based following posts.

8. The method of claim 5, further comprising: determining a display location of each of an advertisement and the recommendation window based on an unseen post among the relationship-based following posts when displaying the advertisement through the following feed tab.

9. A non-transitory computer-readable recording medium comprising instructions that, when executed by a processor, cause the processor to perform the method of claim 1.

10. A computer device comprising:
   a memory configured to store computer-readable instructions; and
   at least one processor configured to execute the computer-readable instructions to configure the computer device to:
      provide a social platform service screen including a recommended feed tab for a first user and a following feed tab for the first user, the recommended feed tab configured to display a personalization-based recommended post for the first user and the following feed tab configured to display relationship-based following posts uploaded by at least one second user having a subscription relationship with the first user contained within a following feed:
      receive an entry request at an entry request point in time, the entry request requesting entry into the social platform service screen; and
      direct the social platform service screen for the first user to initially land, in response to the entry request, on one of the recommended feed tab and the following feed tab selected based on whether a new post uploaded by the second user is present in the following feed at the entry request point in time by:
determining whether the new post uploaded is present in the following feed at the entry request point in time,
directing the social platform service screen to land on the recommended feed tab and displaying the personalization-based recommended post uploaded by at least one third user without the subscription relationship with the first user through the recommended feed tab, in response to a first determination that the new post is absent in the following feed at the entry request point in time, and
in response to a second determination that the new post is present in the following feed at the entry request point in time:
directing the social platform service screen to land on the following feed tab and displaying at least one of the relationship-based following posts through the following feed tab;
determining whether the following feed lacks a new post update for a set period of time after the latest post uploaded by the second user is updated to the following feed; and
displaying the personalization-based recommended post on a first area of the following feed tab higher than a second area of the following feed tab where the relationship-based following posts are simultaneously displayed, in response to the computer device determining that the following feed lacks the new post update for the set period of time.

11. The computer device of claim 10, wherein the at least one processor is configured to display a post update notification on the social platform service screen when a new post is updated to a following feed while a user is browsing the recommended feed tab.

12. The computer device of claim 11, wherein the at least one processor is configured to display a dot-type notification as the post update notification in a tab menu area that represents the following feed tab on the social platform service screen.

13. The computer device of claim 11, wherein the at least one processor is configured to display a floating-button-type notification as the post update notification on the social platform service screen.

14. The computer device of claim 10, wherein the at least one processor is configured to generate a recommendation window within the following feed tab, the recommendation window configured to induce landing to the personalization-based recommended post or the recommended feed tab while a user is browsing the following feed tab.

15. The computer device of claim 14, wherein the at least one processor is configured to determine a display location of the recommendation window based on an unseen post among the relationship-based following posts.

16. The computer device of claim 14, wherein the at least one processor is configured to determine a display location of each of an advertisement and the recommendation window based on an unseen post among the relationship-based following posts when displaying the advertisement through the following feed tab.

\* \* \* \* \*